US011319474B2

(12) United States Patent
Al-Yami et al.

(10) Patent No.: US 11,319,474 B2
(45) Date of Patent: May 3, 2022

(54) OIL-BASED FLUID COMPOSITIONS FOR HYDROCARBON RECOVERY APPLICATIONS

(71) Applicant: Saudi Arabian Oil Company, Dhahran (SA)

(72) Inventors: Abdullah Al-Yami, Dhahran (SA); Vikrant Wagle, Abqaiq (SA); Hussain Al-Bahrani, Qatif (SA); Ali Al-Safran, Dhahran (SA); Nassar Al-Alhareth, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/669,676

(22) Filed: Aug. 4, 2017

(65) Prior Publication Data

US 2018/0223157 A1 Aug. 9, 2018

Related U.S. Application Data

(60) Provisional application No. 62/454,496, filed on Feb. 3, 2017.

(51) Int. Cl.
*C09K 8/36* (2006.01)
*C09K 8/12* (2006.01)
*E21B 21/00* (2006.01)

(52) U.S. Cl.
CPC ............ *C09K 8/12* (2013.01); *C09K 8/36* (2013.01); *E21B 21/00* (2013.01)

(58) Field of Classification Search
CPC . C09K 8/035; C09K 8/34; C09K 8/36; C09K 8/32; C09K 2205/12; C09K 2205/122; C09K 2208/34; C09K 5/00; C09K 5/044; C09K 5/045; C09K 8/584; C09K 2208/12; C09K 2208/30; C09K 8/032; C09K 8/04; C09K 8/08; C09K 8/18; C09K 8/64; C09K 2208/26; C09K 2208/32; C09K 8/20; C09K 8/22; C09K 8/40; C09K 8/424; C09K 8/46; C09K 8/467; C09K 8/48; C09K 8/487; C09K 8/516; C09K 8/588; C09K 8/602; C09K 8/68; C09K 8/74; C09K 2208/28; C09K 8/03; C09K 8/06; C09K 8/12; C09K 8/426; C09K 8/502; C09K 8/506; C09K 8/528; C09K 8/536; C09K 8/54; C09K 8/80; C09K 8/82; C09K 8/84; C09K 8/86; C09K 8/88
See application file for complete search history.

(56) References Cited

U.S. PATENT DOCUMENTS

| 2,965,566 A * | 12/1960 | Hoeppel ............... E21B 21/003 507/137 |
| 4,525,285 A * | 6/1985 | Son ....................... E21B 21/003 507/131 |
| 5,432,152 A | 7/1995 | Dawson et al. |
| 5,589,442 A | 12/1996 | Gee et al. |
| 5,674,816 A | 10/1997 | Loree et al. |
| 5,741,759 A * | 4/1998 | Gee ........................ C09K 8/26 507/103 |
| 5,851,958 A | 12/1998 | Halliday et al. |
| 5,869,433 A | 2/1999 | Patel |
| 5,869,434 A * | 2/1999 | Mueller ................... C09K 8/26 507/103 |
| 5,909,779 A | 6/1999 | Patel et al. |
| 6,022,833 A * | 2/2000 | Mueller ................... C09K 3/00 175/66 |
| 6,054,415 A | 4/2000 | Gee et al. |
| 6,057,272 A | 5/2000 | Gee et al. |
| 6,323,157 B1 | 11/2001 | Carpenter et al. |
| 6,518,224 B2 | 2/2003 | Wood |
| 7,067,460 B2 | 6/2006 | Summerhill et al. |
| 7,148,183 B2 | 12/2006 | Quintero |
| 7,741,248 B2 | 6/2010 | Mueller et al. |
| 8,030,248 B2 | 10/2011 | Lee et al. |
| 8,141,661 B2 | 3/2012 | Kakadjian et al. |
| 8,252,729 B2 | 8/2012 | Zhang |
| 8,950,492 B2 | 2/2015 | Maghrabi et al. |
| 9,879,169 B2 | 1/2018 | Jeon et al. |
| 11,214,724 B1 | 1/2022 | Wagle et al. |
| 2004/0058824 A1 | 3/2004 | Burbach et al. |
| 2004/0198618 A1 | 10/2004 | Abazajian et al. |
| 2007/0021307 A1* | 1/2007 | Pomerleau ............. C09K 8/035 507/204 |
| 2007/0219097 A1 | 9/2007 | Mueeller et al. |

(Continued)

FOREIGN PATENT DOCUMENTS

| AU | 732612 B2 | 4/2001 |
| CA | 2449869 A1 | 5/2005 |

(Continued)

OTHER PUBLICATIONS

Product data sheet Duratone HT downloaded on Dec. 19, 2018.*
Product data sheet Bentonite downloaded on Dec. 19, 2018.*
Product data sheet Geltone II downloaded on Dec. 19, 2018.*
Neodene 14/16 product data sheet downloaded on Aug. 25, 2020.*
http://www.inchem.org/documents/icsc/icsc/eics1561.htm downloaded on Aug. 25, 2020.*
International Search Report and Written Opinion for related PCT application PCT/US2017/045494 dated Nov. 7, 2017.

*Primary Examiner* — Kumar R Bhushan
(74) *Attorney, Agent, or Firm* — Bracewell LLP; Constance G. Rhebergen; Brian H. Tompkins

(57) ABSTRACT

Disclosed here are drilling fluid compositions containing linear alpha olefins, an invert emulsifier, a filtration control agent; and an inorganic mineral component including one or more of lime, calcium chloride, and barite. Also disclosed here are methods of using such compositions during drilling operations for recovery of hydrocarbons. Various other embodiments may be disclosed and claimed.

15 Claims, No Drawings

(56) References Cited

U.S. PATENT DOCUMENTS

| | | | |
|---|---|---|---|
| 2007/0219098 A1* | 9/2007 | Mueller | C09K 8/28 |
| | | | 507/116 |
| 2011/0251445 A1 | 10/2011 | Takeuchi et al. | |
| 2012/0071368 A1 | 3/2012 | Feffer | |
| 2013/0331303 A1 | 12/2013 | Rife et al. | |
| 2015/0218433 A1 | 8/2015 | Nguyen et al. | |
| 2015/0315452 A1 | 11/2015 | Elomari et al. | |
| 2015/0322324 A1 | 11/2015 | Dean et al. | |
| 2016/0083640 A1* | 3/2016 | Van Slyke | E21B 7/00 |
| | | | 175/70 |

FOREIGN PATENT DOCUMENTS

| | | | |
|---|---|---|---|
| CN | 1235628 A | | 11/1999 |
| CN | 105378025 A | | 3/2016 |
| CN | 103210055 A | | 7/2017 |
| EP | 0627481 B1 | | 9/1998 |
| WO | 95/21225 A1 | | 8/1995 |
| WO | WO9521225 | * | 8/1995 |
| WO | 2001002512 A1 | | 1/2001 |
| WO | 2012054369 A2 | | 4/2012 |
| WO | 2013048972 A2 | | 4/2013 |

* cited by examiner

OIL-BASED FLUID COMPOSITIONS FOR HYDROCARBON RECOVERY APPLICATIONS

CROSS-REFERENCE TO RELATED APPLICATIONS

This application claims priority to and benefit of U.S. Provisional Patent Application No. 62/454,496 titled "Oil-Based Fluid Compositions for Hydrocarbon Recovery Applications" filed on Feb. 3, 2017, the entire contents of which is incorporated herein by reference.

TECHNICAL FIELD

The disclosure relates to fluid compositions used for drilling and well servicing activities in hydrocarbon recovery.

BACKGROUND

Production from a hydrocarbon reservoir starts after successful exploration and development of an oil or gas well. The recovery of hydrocarbons is dependent on using appropriate drilling fluids. Ongoing well servicing activities are required to maintain or enhance the well productivity. Oil-based drilling fluids and well servicing fluids are generally invert emulsion or direct emulsion mixtures. These oil based fluids improve lubricity, minimize problems associated with water-sensitive formations, and address other site-specific conditions, such as temperature. Considerations of safety, low viscosity, and availability has made diesel oil the most common base oil. Special oils such as the Safra® oil (from Safra Co. Ltd. headquartered in Jeddah, Saudi Arabia) have been prepared through the removal of aromatic fractions to address environmental concerns. Other environmentally acceptable oils are mineral oils and esters/ethers. These oils are very expensive and require expensive modifications of the drilling rigs, new handling and recovery procedures, and special transportation and storage facilities.

SUMMARY

Oil-based fluids disclosed and described here contain linear alpha olefins that address the shortcomings of the art. Embodiments include drilling fluid compositions that include an olefins base containing linear alpha olefins in the range of 50 to 100% of the mass percent of all olefins present in the olefins base, branched olefins in the range of 0 to 10% of the mass percent of all olefins present in the olefins base, and internal olefins in the range of 0 to 10% of the mass percent of all olefins present in the olefins base. These fluid compositions further include one or more of an invert emulsifier, a filtration control agent, and an inorganic mineral component. These fluid compositions further include a viscosifier. This mineral component can be one or more of lime, calcium chloride, and barite. The linear alpha olefins can include C14-C18 linear alpha olefins. The linear alpha olefins can include one or more of tetradecene-1, hexadecane-1, and octadecene-1. These drilling fluid compositions can further include a mixture of saturated linear alpha carboxylic acids. The saturated linear alpha carboxylic acids can include C12-C20 saturated linear alpha carboxylic acids. The saturated linear alpha carboxylic acids include C16-C18 saturated linear alpha carboxylic acids. In certain embodiments, the drilling fluid composition is substantially free of polyalphaolefins.

Embodiments also include methods of treating a wellbore with a drilling fluid. One such method includes the steps of introducing a drilling fluid into a wellbore and circulating the drilling fluid through the wellbore. The drilling fluid used in these methods include drilling fluid compositions that include an olefins base containing linear alpha olefins in the range of 50 to 100% of the mass percent of all olefins present in the olefins base, branched olefins in the range of 0 to 10% of the mass percent of all olefins present in the olefins base, and internal olefins in the range of 0 to 10% of the mass percent of all olefins present in the olefins base. These fluid compositions further include one or more of an invert emulsifier; a filtration control agent; and an inorganic mineral component. This mineral component can be one or more of lime, calcium chloride, and barite. The linear alpha olefins can include C14-C18 linear alpha olefins. The linear alpha olefins can include one or more of tetradecene-1, hexadecane-1, and octadecene-1. In certain embodiments, the drilling fluid composition is substantially free of polyalphaolefins. These drilling fluid compositions can further include a mixture of saturated linear alpha carboxylic acids. The saturated linear alpha carboxylic acids can include C12-C20 saturated linear alpha carboxylic acids. The saturated linear alpha carboxylic acids include C16-C18 saturated linear alpha carboxylic acids.

DETAILED DESCRIPTION

The disclosure here describes various formulations of a high performance oil-based fluid that addresses the shortcomings in the art, and is used hydrocarbon recovery operations, such as in oil and gas drilling operations. Embodiments include drilling fluid compositions based on linear alpha olefins and methods for altering the rheological properties of drilling fluids by providing linear alpha olefins as the base for the oil-based drilling fluids, and methods for drilling wellbores employing such improved drilling fluids.

The linear alpha olefins in these fluid compositions contain at least 12 carbon atoms. Certain embodiments include C14-C18 linear alpha olefins as the base for the drilling fluid. Various embodiments contain specific C14-C18 linear alpha olefins, such as tetradecene-1, hexadecane-1, octadecene-1, and combinations thereof. In certain embodiments, the concentration of the C14-C18 linear alpha olefins in the olefin-based formulation can range from approximately 50 to 100% of the mass percent of all the olefins present in the base. In certain embodiments, the concentration of the C14-C18 linear alpha olefins in the olefin-based formulation can range from approximately 80 to 100% of the mass percent of all the olefins present in the base. Linear internal olefins, which contain Carbon-Carbon double bonds (C═C) can be more vulnerable to electrophilic attack. In the event of a reaction with an electrophile, the internal olefins form secondary carbocations while linear alpha olefin form primary carbocations. The secondary carbocations are more susceptible to electrophilic attack than the primary carbocations. As oil-based fluids are generally used under high temperature, high pressure conditions, there is an increased chance of the internal olefins being attacked by an electrophile. Such an attack can alter the chemical nature of the base oil, thereby destabilizing the water-in oil emulsion of the drilling fluid. So, the base oil described here was formulated with less than 10% of internal olefins. The concentration of the branched olefins in the linear olefin-based formulation can range from approximately 0 to 10% of the mass percent of all the olefins present in the base. The concentration of internal olefins in the olefin-based formulation can range from approximately 0 to 10% of the mass percent of all the olefins present in the base. Polyalphaolefins can be expensive as compared to linear alpha olefins, and thus, not suitable for all operations. In certain embodiments, the drilling fluid composition is substantially free of polyalphaolefins. As used herein, "substantially free" of a component means that the component is present in the olefins base of drilling composition in an amount less than about 1% of the mass percent of all the olefins present in the base. The drilling fluid composition is further defined in some embodiments by its physical properties such as Yield Point (YP). In certain embodiments, the drilling fluid composition has a yield point greater than 10 lb/100 ft$^2$. The drilling fluid composition can have a yield point ranging from 10 lb/100 ft$^2$ to 45 lb/100 ft$^2$. The drilling fluid composition can have a yield point ranging from 10 lb/100 ft$^2$ to 30 lb/100 ft$^2$.

In the following description, numerous details are set forth in order to provide a thorough understanding of the various embodiments. In other instances, well-known processes, devices, and systems may not been described in particular detail in order not to unnecessarily obscure the various embodiments. Other embodiments may be utilized, and changes may be made without departing from the scope of this disclosure.

The description may use the phrases "in various embodiments," "in an embodiment," or "in embodiments," which may each refer to one or more of the same or different embodiments. Furthermore, the terms "comprising," "including," "having," "containing," and the like, as used with respect to embodiments of the present disclosure, are synonymous.

Certain embodiments include a blend of linear alpha olefins containing tetradecene-($CH_3(CH_2)_{11}CH=CH_2$), hexadecene-1 ($CH_3(CH_2)_{13}CH=CH_2$), and octadecene-1 ($CH_3(CH_2)_{15}CH=CH_2$) that is used as the base for a drilling fluid formulation. In other embodiments, this blend of linear alpha olefins replaces mineral oil or diesel oil as the base oil for oil-based drilling fluids. As an example, the physical properties and the component specifications of a blend of linear alpha olefins that is used to formulate a drilling fluid, according to an embodiment, are shown in Table 1 and Table 2. Linear alpha olefins are more environmentally-compatible than diesel-based fluids. Moreover, linear alpha olefins have a higher flash point than diesel.

TABLE 1

| Parameter | Quantity |
| --- | --- |
| Molecular weight | 220 gram/mole |
| Boiling Point | 275 degrees Celsius (° C.) |
| Freezing Point | 3° C. |
| Flash Point | 115° C. |
| Density at 20° C. | 0.777 grams per cubic centimeter (gm/cm$^3$) |
| Kinematic viscosity at 20° C. | 2.75 square millimeters per second (mm$^2$/sec) |

TABLE 2

| Parameter | Unit | Quantity |
| --- | --- | --- |
| Carbon number, C14 | Mass % | 47-53 |
| Carbon number, C16 | Mass % | 25-35 |
| Carbon number, C18 | Mass % | 14-24 |
| n-alpha olefin | Mass % | 91 minimum |
| Branched olefins | Mass % | 4 maximum |
| Internal olefins | Mass % | 5 maximum |

TABLE 2-continued

| Parameter | Unit | Quantity |
| --- | --- | --- |
| Paraffins | Mass % | 0.3 maximum |
| Peroxides as active O | parts per million (ppm), weight % (wt %) | Nil |
| Carbonyls as C=O | ppm, wt % | Nil |
| Water | ppm, wt % | 10 maximum |
| Color (ASTM D 156-02) | Saybolt color units | +30 |

In an embodiment, a drilling fluid is formulated with C14-C18 linear alpha olefins as the base oil. Embodiments include drilling fluids containing C14-C18 linear alpha olefins in combination with water and other components to provide desirable density, viscosity, filtration control, rheology control, pH-control, surface activity modification, lubrication, flocculation, and protection from toxic or corrosive agents, or combinations thereof. The drilling fluids can contain clays, natural or synthetic polymers, a weighting agent, an inert solid, a fluid loss-control agent, a salt, a dispersant, a corrosion inhibitor, thinner, thickener, a viscosifier, or a defoamer. Examples of weighting agents used in these embodiments include, without limitations, high-specific gravity and finely divided solid materials, such as barite, hematite, calcium carbonate, siderite, or ilmenite, or manganese tetroxide. Examples of inert solids or certain chemically inactive solids present in the suspension include, without limitations, limestone, dolomite sands, salts or loading materials such as barite. Examples of fluid loss-control agents used in these embodiments include, without limitations, starches, modified starches, cellulose, modified cellulose, synthetic polymers, such as sulfonated co and terpolymers, polyacrylates, polyacrylamides, organolignites and lignites, and combinations thereof. Examples of thinners used to reduce viscosity and gel strength in these embodiments include, without limitations, lignosulfonates, polyphosphates, polyacrylates of low molecular weight, sulfonated polymers, phosphonic polymers, acrylic comb polymers, and other synthetic polymers. Examples of corrosion inhibitors used in these embodiments include, without limitations, chemical scavengers of oxygen, carbon dioxide, or hydrogen sulfide. A variety of surfactants serve as emulsifiers, foamers and defoamers, wetting agents and lubricants.

For example, Tables 3, 6, and 9 show different formulations of linear alpha olefin-based drilling fluids. The formulation described in Example 1 contains C14-C18 linear alpha olefins and the C16-C18 fatty acids as two separate components. The C14-C18 linear alpha olefin is the base oil of this drilling fluid formulation, while the fatty acids function as rheology modifiers of the fluid formulation. Other rheology modifiers like organoclays or polymeric viscosifiers can be used in these formulation instead of the C16-C18 fatty acids.

In various embodiments, the fluid can be formulated to have an oil to water ratio of approximately 60 to 40 to approximately 95 to 5 by volume of oil to water. The linear alpha olefin-based fluid can be formulated to have salts such as calcium chloride ($CaCl_2$), potassium chloride (KCl), sodium chloride (NaCl), and other appropriate salts and combinations thereof. In an embodiment, the drilling fluid has a water phase salinity concentration of approximately 250 thousand parts per million. In various embodiments, the fluid can be formulated to have a water phase salinity concentration of approximately 100 to 390 thousand parts per million. In various embodiments, the fluid can be formulated to have approximately 1.5 pounds per barrel (lbm/bbl) of lime. In various embodiments, the fluid can be formulated to have approximately 0.5 to 7 lbm/bbl of lime.

An embodiment of the drilling fluid has oil in water ratio of 70:30, a density of 90 pounds per cubic foot (pcf), and calcium chloride concentration of approximately 250,000 ppm. In various embodiments, the fluid can be formulated to have approximately 10 lbm/bbl of the invert emulsifier. In various embodiments, the fluid can be formulated to have approximately 5 to 25 lbm/bbl of the invert emulsifier. In various embodiments, the invert emulsifier can be LE SUPERMUL™ emulsifier (available from Halliburton Company, headquartered in Houston, Tex., USA). In various embodiments, the invert emulsifier can be any suitable invert emulsifier for formulating drilling fluids.

The fluid compositions are further defined by two properties—plastic viscosity (PV) and Yield Point (YP). Generally, plastic viscosity (PV) is obtained from the Bingham-Plastic rheological model and represents the viscosity of a drilling fluid when extrapolated to infinite shear rate. The PV is determined by the difference between the viscometer readings at the 600 rpm and the 300 rpm settings, for example as shown below in Tables 5, 8, and 11. For a drilling fluid, the PV should be as low as possible. The value of PV will depend on the drilling fluid density. Fluids with low PV can function in rapid drilling circumstances because, among other properties, such fluids have low viscosity upon exiting the drill bit and has an increased flow rate. A high PV may be caused by a viscous base fluid, excess colloidal solids, or both. Yield Point (YP) is defined as the value obtained from the Bingham-Plastic rheological model when the yield stress is extrapolated to a shear rate of zero. YP is calculated by subtracting PV from the viscometer readings at the 300 rpm setting. YP is used to evaluate a drilling fluid's ability to lift small pieces of rock dislodged by the drill bit out of the annulus (the wellbore and casing or between casing and tubing, where the drilling fluid flows). Fluids with high YP can carry cuttings better than a fluid of similar density but lower YP. Invert emulsion fluids with superior rheological properties have been formulated. A fluid with low PV and optimum YP will ensure faster drilling and good cuttings carrying capacity and better barite sag resistance. In certain embodiments, the YP is greater than 10 lb/100 ft$^2$. In other embodiments, a drilling fluid can be formulated to have a YP in the range of 10 lb/100 ft$^2$ to 45 lb/100 ft$^2$. In other embodiments, the drilling fluid containing linear alpha olefins can be formulated to have a YP in the range of 10 lb/100 ft$^2$ to 30 lb/100 ft$^2$ for good hole cleaning and barite sag resistance. The amount of linear alpha olefin in a drilling fluid will depend on the desired drilling fluid density. Fluids with higher mud weights are designed to have higher oil to water ratio. This lowers the rheology of the drilling fluid. Fluids with higher mud weight have high number of particles in it, which increases the rheology.

Certain embodiments include methods for treating a wellbore with a drilling fluid. One such method includes the steps of introducing a drilling fluid into a wellbore and circulating the drilling fluid through the wellbore. The drilling fluid used in this method can have an olefins base containing linear alpha olefins in the range of 50 to 100% of the mass percent of all olefins present in the olefins base, branched olefins in the range of 0 to 10% of the mass percent of all olefins present in the olefins base, and internal olefins in the range of 0 to 10% of the mass percent of all olefins present in the olefins base. The drilling fluid can further include a mixture of saturated linear alpha carboxylic acids, which can be a wide range of C12-C20 saturated linear alpha carboxylic acids, or a narrower range of C16-C18 saturated linear alpha carboxylic acids. The linear alpha olefins can include C14-C18 linear alpha olefins. And in other embodiments, the linear alpha olefins can include one or more of tetradecene-1, hexadecane-1, and octadecene-1. In certain embodiments, the drilling fluid composition is substantially free of polyalphaolefins. In certain embodiments, the drilling fluid composition has a yield point greater than 10 lb/100 ft$^2$. The drilling fluid composition can have a yield point ranging from 10 lb/100 ft$^2$ to 45 lb/100 ft$^2$. The drilling fluid composition can have a yield point ranging from 10 lb/100 ft$^2$ to 30 lb/100 ft$^2$.

The following specific and non-limiting examples are to be construed as merely illustrative, and do not limit the present disclosure in any way whatsoever. Without further undue experimentation, one skilled in the art can, based on the description here and the examples, utilize the present disclosure to its fullest extent.

EXAMPLES

Example 1

The following formulation of linear alpha olefins-based drilling fluids was developed. As shown in Table 3, this formulation was developed by mixing approximately 144.4 pounds per gallon (ppg) of C14-C18 linear alpha olefins with an invert emulsifier (LE SUPERMUL™) in an amount of 10 lbm/bbl for about two minutes. Lime was added to this mixture in an amount of 1.5 lbm/bbl, followed by mixing for about two minutes. The C16-C18 fatty acid composition in an amount of 1.5 lbm/bbl was added to the mixture, followed by mixing for about five minutes. To this mixture, a filtration control agent (ADAPTA®, available from Halliburton Company, headquartered in Houston, Tex., USA) in an amount of 2 lbm/bbl was added, followed by mixing for about five minutes. The filtration control agent is a cross-linked methylstyrene/acrylate copolymer and is to control fluid loss while minimizing impacts on plastic viscosity. Calcium chloride ($CaCl_2$) in an amount of 29.5 lbm/bbl and water in an amount of 84.9 lbm/bbl followed by mixing for about five minutes. In various embodiments, a weighting agent can be used to increase densities of drilling fluids, such as a BAROID® weighting agent (available from Halliburton Company, headquartered in Houston, Tex., USA). Here, barite (barium sulfate, $BaSO_4$) in an amount of 228.8 lbm/bbl was then added to the mixture, followed by mixing for about ten minutes.

TABLE 3

| Components | Mixing Time (minutes) | Amount |
|---|---|---|
| C14-C18 linear alpha olefins, ppg | | 144.4 |
| LE SUPERMUL ™, lbm/bbl | 2 | 10 |
| lime, lbm/bbl | 2 | 1.5 |
| C16-C18 fatty acid | 5 | 1.5 |
| ADAPTA ®, lbm/bbl | 5 | 2 |
| $CaCl_2$, lbm/bbl | 5 | 29.5 |
| Water, lbm/bbl | | 84.9 |
| BAROID, lbm/bbl | 10 | 228.8 |

Properties of the drilling fluid formulation, such as viscosity and gel strength, were analyzed using a standard oilfield viscometer. Shear rate measurements were taken with the fluids at 120° F. An example of a standard oilfield viscometer can include a FANN® Model 35 Viscometer, available from Fann Instrument Company, headquartered in Houston, Tex., USA. Gel Strength test used was according to the American Petroleum Institute (API) Recommended Practice 13B-2 (RP 13B-2). The shear stress (scale or dial reading) is determined as a function of the shear rate (from the speed of rotation), and provided as centipoise (cP). The dial readings at different rotor sleeve speeds of 3, 6, 100, 200, 300 and 600 rpm are shown in Table 4. Drilling fluids are also characterized by evaluating 10 second and 10 minute gel strength. The 10 second gel test is performed using a FANN® viscometer, and allowing the drilling fluid to rest for 10 seconds before measuring the peak shear stress at 3 rpm. The 10 minute gel test is performed using a FANN® viscometer, and allowing the drilling fluid to rest for 10 minute before measuring the peak shear stress at 3 rpm. Measurements from these tests provide an indication of the drilling fluids' ability to keep cuttings suspended.

TABLE 4

| Test condition | Reading (cP) |
| --- | --- |
| 600 rpm | 47 |
| 300 rpm | 30 |
| 200 rpm | 21 |
| 100 rpm | 14 |
| 6 rpm | 5 |
| 3 rpm | 4 |
| 10 s test | 5 |
| 10 m test | 5 |

The PV of the fluid described in this Example 1 is determined by the difference between the viscometer readings at the 600 rpm and the 300 rpm settings obtained from Table 4. The YP was calculated by subtracting PV from the viscometer readings at the 300 rpm setting. Table 5 presents the PV and YP for the drilling fluid composition described in Example 1.

TABLE 5

| Calculated property | Value |
| --- | --- |
| PV (cP) | 17 |
| YP (lbf/100 ft$^2$) | 13 |

Example 2

As another example of a linear alpha olefins-based drilling fluid, a 90 pcf organoclay-based invert emulsion drilling fluid composition was developed. As shown in Table 6, this formulation was developed by mixing approximately 141.7 pounds per gallon (ppg) of C14-C18 linear alpha olefins with an invert emulsifier (CARBOMUL-HT™) in an amount of 11 lbm/bbl for about two minutes. Lime was added to this mixture in an amount of 6 lbm/bbl, followed by mixing for about two minutes. An organophilic clay viscosifier, GELTONE II viscosifier (available from Halliburton Company, headquartered in Houston, Tex., USA), in an amount of 3.5 lbm/bbl was added to the mixture, followed by mixing for about five minutes. A liquid additive, RHEMOD™ L (available from Halliburton Company, headquartered in Houston, Tex., USA), in an amount of 2.5 lbm/bbl was added to the mixture, followed by mixing for about five minutes. A filtration control agent, DURATONE® HT agent (available from Halliburton Company, headquartered in Houston, Tex., USA), in an amount of 6 lbm/bbl was added to the mixture, followed by mixing for about five minutes. Calcium chloride (CaCl$_2$) in an amount of 28.8 lbm/bbl was added followed by water in an amount of 83 lbm/bbl and the mixture was mixed for about five minutes. A friction reducing material, Rev Dust™ montmorillonite clay agent (available from Deluxe Testing Equipment, Inc., headquartered in Conroe, Tex., USA), in an amount of 20 lbm/bbl was added, followed by mixing for about five minutes. Barite (barium sulfate, BaSO4) in an amount of 203.1 lbm/bbl was then added to the mixture, followed by mixing for about five minutes.

TABLE 6

| Components | Mixing Time (minutes) | Amount |
| --- | --- | --- |
| C14-C18 base oil | | 141.7 |
| CARBOMUL HT, ppb | 2 | 11 |
| LIME, ppb | 2 | 6 |
| GELTONE II, ppb | 5 | 3.5 |
| RHEMOD L, ppb | 5 | 2.5 |
| DURATONE HT, ppb | 5 | 6 |
| CaCl$_2$, ppb | 5 | 28.8 |
| Water, ppb | | 83 |
| Revdust, ppb | 5 | 20 |
| Barite, ppb | 5 | 203.1 |

Properties of the drilling fluid formulation, such as viscosity and gel strength, were analyzed using a standard oilfield viscometer. Shear rate measurements were taken with the fluids after hot rolling for 16 hours at 250° F. and are present in Table 7.

TABLE 7

| Test condition | Reading (cP) |
| --- | --- |
| 600 rpm | 77 |
| 300 rpm | 46 |
| 200 rpm | 36 |
| 100 rpm | 26 |
| 6 rpm | 12 |
| 3 rpm | 11 |

The PV of the fluid described in this Example 2 was determined by the difference between the viscometer readings at the 600 rpm and the 300 rpm settings obtained from Table 7. The YP was calculated by subtracting PV from the viscometer readings at the 300 rpm setting. Table 8 presents the PV and YP for the drilling fluid composition described in Example 2. The fluid gave a PV and YP of 31 and 15 respectively after hot rolling. A more convenient means of estimating the Yield Stress is by calculating the Low-Shear Yield Point (LSYP) by the formula shown below in Equation 2 except with the 6 rpm and 3 rpm readings substituted for the 600-rpm and 300-rpm readings, respectively. This fluid had a Low Shear Yield Point (LSYP) value of 10 showed that the fluid had good cuttings carrying capacity and is resistant to barite sag.

TABLE 8

| Calculated property | Value |
| --- | --- |
| PV (cP) | 31 |
| YP (lbf/100 ft$^2$) | 15 |
| LSYP | 10 |
| Gel strength, 10 sec | 18 |

TABLE 8-continued

| Calculated property | Value |
|---|---|
| Gel strength, 10 min | 26 |
| HTHP fluid loss, 30 min, ml | 2 |

Example 3

As another example of a linear alpha olefins-based drilling fluid, a 90 pcf organoclay-free invert emulsion drilling fluid composition was developed. As shown in Table 9, this formulation was developed by mixing approximately 141.7 pounds per gallon (ppg) of C14-C18 linear alpha olefins with an invert emulsifier (LE SUPERMUL™) in an amount of 11 lbm/bbl for about two minutes. Lime was added to this mixture in an amount of 1.5 lbm/bbl, followed by mixing for about two minutes. A liquid additive, RHEMOD™ L (available from Halliburton Company, headquartered in Houston, Tex., USA), in an amount of 3 lbm/bbl was added to the mixture, followed by mixing for about five minutes. To this mixture, a filtration control agent (ADAPTA®, available from Halliburton Company, headquartered in Houston, Tex., USA) in an amount of 3 lbm/bbl was added, followed by mixing for about five minutes. Calcium chloride ($CaCl_2$) in an amount of 28.9 lbm/bbl was added followed by water in an amount of 83.3 lbm/bbl and the mixture was mixed for about five minutes. The TAU-MOD™ amorphous/fibrous material, available from Halliburton Company, headquartered in Houston, Tex., USA, which acts as a viscosifier and suspension agent, was added in an amount of 5 lbm/bbl, followed by mixing for about five minutes. The friction reducing material, Rev Dust™ montmorillonite clay agent, in an amount of 20 lbm/bbl was added, followed by mixing for about five minutes. Barite (barium sulfate, $BaSO_4$) in an amount of 208.3 lbm/bbl was then added to the mixture, followed by mixing for about five minutes.

TABLE 9

| Components | Mixing Time (minutes) | Amount |
|---|---|---|
| C14-C18 base oil | | 141.7 |
| LE-SUPERMUL, ppb | 2 | 11 |
| LIME, ppb | 2 | 1.5 |
| RHEMOD L | 5 | 3 |
| ADAPTA | 5 | 3 |
| $CaCl_2$, ppb | 5 | 28.9 |
| Water, ppb | | 83.3 |
| TAU-MOD | 5 | 5 |
| Revdust, ppb | 5 | 20 |
| Barite, ppb | 5 | 208.3 |

Properties of the drilling fluid formulation, such as viscosity and gel strength, were analyzed using a standard oilfield viscometer. Shear rate measurements were taken with the fluids after hot rolling for 16 hours at 250° F. and are present in Table 7.

TABLE 10

| Test condition | Reading (cP) |
|---|---|
| 600 rpm | 104 |
| 300 rpm | 67 |
| 200 rpm | 53 |

TABLE 10-continued

| Test condition | Reading (cP) |
|---|---|
| 100 rpm | 38 |
| 6 rpm | 15 |
| 3 rpm | 14 |

The PV of the fluid described in this Example 3 is determined by the difference between the viscometer readings at the 600 rpm and the 300 rpm settings obtained from Table 10. The YP was calculated by subtracting PV from the viscometer readings at the 300 rpm setting. Table 11 presents the PV and YP for the drilling fluid composition described in Example 3. The fluid gave a PV and YP of 37 and 30 respectively after hot rolling. This fluid had a LSYP value of 13, indicating that the fluid had good cuttings-carrying capacity and is resistant to barite sag.

TABLE 11

| Calculated property | Value |
|---|---|
| PV (cP) | 37 |
| YP (lbf/100 ft$^2$) | 30 |
| LSYP | 13 |
| Gel strength, 10 sec | 18 |
| Gel strength, 10 min | 26 |
| HTHP fluid loss, 30 min, ml | 4 |

PV values are dependent on the mud weight, the number of additives, and the type of additives added in a fluid. Fluids with a low number of additives will generally have lower PV values. Also, addition of solids like organoclay, organolignite, and rheology modifiers tend to increase the PV values. Low PV values are preferred for drilling fluid compositions. A PV value of below 40 is generally acceptable for a 90 pcf fluid.

Ranges may be expressed herein as from about one particular value and to about another particular value. When such a range is expressed, it is to be understood that an embodiment is from the one particular value to the other particular value, along with all possible sub-ranges and combinations of sub-ranges thereof. A recited range (e.g., mass or weight percentages or carbon groups) includes each specific value, integer, decimal, or identity within the range. Any listed range can be easily recognized as sufficiently describing and enabling the same range being broken down into at least equal halves, thirds, quarters, fifths, or tenths as appropriate. As will also be understood by one skilled in the art, all language such as "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. Where a method comprising two or more defined steps is recited or referenced herein, the defined steps can be carried out in any order or simultaneously except where the context excludes that possibility. While various embodiments have been described in detail for the purpose of illustration, they are not to be construed as limiting, but are intended to cover all the changes and modifications within the spirit and scope thereof.

What is claimed is:

1. An invert emulsion drilling fluid composition, comprising:
   an olefins base containing linear alpha olefins in the range of 80 to 100% of the mass percent of all olefins present in the olefins base, branched olefins in the range of 0 to 10% of the mass percent of all olefins present in the olefins base, and internal olefins in the range of 0 to 10% of the mass percent of all olefins present in the olefins base of the invert emulsion drilling fluid composition, wherein the linear alpha olefins include C14-C18 linear alpha olefins, wherein the amount of C14 linear alpha olefins is 47 mass % to 53 mass %, the amount of C16 linear alpha olefins is 25 mass % to 35 mass %, and the amount of C18 linear alpha olefins is 14 mass % to 24 mass %;
   a rheology modifier comprising a mixture of C16-C18 saturated linear alpha carboxylic acids;
   an invert emulsifier;
   a viscosifier;
   a filtration control agent; and
   an inorganic mineral component including one or more of lime, calcium chloride, and barite; and
   a salt, wherein the invert emulsion drilling fluid composition has a water phase salinity concentration of 100 thousand parts per million (ppm) to 390 thousand ppm.

2. The invert emulsion drilling fluid composition of claim 1, wherein the linear alpha olefins include one or more of tetradecene-1, hexadecane-1, and octadecene-1.

3. The invert emulsion drilling fluid composition of claim 1, wherein the drilling fluid composition has a yield point greater than 10 lb/100 ft$^2$.

4. The invert emulsion drilling fluid composition of claim 1, wherein the drilling fluid composition has a yield point ranging from 10 lb/100 ft$^2$ to 45 lb/100 ft$^2$.

5. The invert emulsion drilling fluid composition of claim 1, wherein the drilling fluid composition has a yield point ranging from 10 lb/100 ft$^2$ to 30 lb/100 ft$^2$.

6. The invert emulsion drilling fluid composition of claim 1, wherein the drilling fluid composition is substantially free of polyalphaolefins.

7. A method of treating a wellbore with a drilling fluid of claim 1, the method comprising: introducing the drilling fluid into the wellbore, and circulating the drilling fluid through the wellbore.

8. The method of claim 7, wherein the saturated linear alpha carboxylic acids include C16-C18 saturated linear alpha carboxylic acids.

9. The method of claim 8, wherein the linear alpha olefins include C14-C18 linear alpha olefins.

10. The method of claim 8, wherein the linear alpha olefins include one or more of tetradecene-1, hexadecane-1, and octadecene-1.

11. The method of claim 8, wherein the drilling fluid has a yield point greater than 10 lb/100 ft$^2$.

12. The method of claim 8, wherein the drilling fluid has a yield point ranging from 10 lb/100 ft$^2$ to 45 lb/100 ft$^2$.

13. The method of claim 8, wherein the drilling fluid has a yield point ranging from 10 lb/100 ft$^2$ to 30 lb/100 ft$^2$.

14. The method of claim 8, wherein the drilling fluid is substantially free of polyalphaolefins.

15. The invert emulsion drilling fluid composition of claim 1, wherein the salt comprises at least one of calcium chloride (CaCl$_2$)), potassium chloride (KCl), sodium chloride (NaCl).

* * * * *